United States Patent
Lakkis

(10) Patent No.: US 8,855,222 B2
(45) Date of Patent: Oct. 7, 2014

(54) CODES AND PREAMBLES FOR SINGLE CARRIER AND OFDM TRANSMISSIONS

(75) Inventor: Ismail Lakkis, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 1089 days.

(21) Appl. No.: 12/572,876

(22) Filed: Oct. 2, 2009

(65) Prior Publication Data

US 2010/0086076 A1    Apr. 8, 2010

Related U.S. Application Data

(60) Provisional application No. 61/103,503, filed on Oct. 7, 2008.

(51) Int. Cl.

| | |
|---|---|
| *H04K 1/10* | (2006.01) |
| *H04L 27/28* | (2006.01) |
| *H04J 13/10* | (2011.01) |
| *H04L 25/02* | (2006.01) |
| *H04J 13/00* | (2011.01) |
| *H04L 27/00* | (2006.01) |

(52) U.S. Cl.
CPC ............ *H04L 25/0202* (2013.01); *H04J 13/10* (2013.01); *H04J 13/0014* (2013.01); *H04L 27/0008* (2013.01)
USPC ............................ 375/260; 375/262; 375/258

(58) Field of Classification Search
USPC .................... 375/279, 260, 285, 371
See application file for complete search history.

(56) References Cited

U.S. PATENT DOCUMENTS

| | | | | |
|---|---|---|---|---|
| 5,841,813 | A * | 11/1998 | van Nee | 375/279 |
| 6,839,876 | B1 * | 1/2005 | Tong et al. | 714/783 |
| 7,103,085 | B1 | 9/2006 | Dabak et al. | |
| 7,532,663 | B2 * | 5/2009 | Lewis | 375/150 |
| 7,656,934 | B2 | 2/2010 | Dabak et al. | |
| 7,738,437 | B2 | 6/2010 | Ma et al. | |
| 7,929,563 | B2 * | 4/2011 | Wang et al. | 370/430 |
| 7,995,456 | B2 * | 8/2011 | Fuente et al. | 370/208 |
| 2005/0102605 | A1 | 5/2005 | Gupta et al. | |
| 2005/0238087 | A1 | 10/2005 | Yang et al. | |
| 2006/0274841 | A1 * | 12/2006 | Wang et al. | 375/260 |
| 2007/0033509 | A1 | 2/2007 | Gupta | |
| 2007/0113159 | A1 | 5/2007 | Lakkis | |
| 2008/0095121 | A1 * | 4/2008 | Shattil | 370/335 |

(Continued)

FOREIGN PATENT DOCUMENTS

| | | |
|---|---|---|
| JP | 2004515935 A | 5/2004 |
| JP | 2008199140 A | 8/2008 |
| JP | 2013222792 A | 10/2013 |

OTHER PUBLICATIONS

Hiroshi Harada, "IEEE 802.15-07-0761-10-003C Unified and flexible millimeter wave WPAN systems supported by common mode" TG3C—IEEE 802.15-07-0761-10-003C,, Sep. 18, 2007, pp. 1-62, XP002508475 the whole document pp. 37-39 Appendix I, II : pp. 59 and 60.

(Continued)

*Primary Examiner* — Qutbuddin Ghulamali
(74) *Attorney, Agent, or Firm* — Dang M. Vo

(57) ABSTRACT

Certain aspects of the present disclosure relate to a method for generating a frame structure suitable for use in both single carrier (SC) and Orthogonal Frequency Division Multiplexing (OFDM) transmission modes, while ensuring accurate channel estimation at a receiver.

34 Claims, 14 Drawing Sheets

(56) References Cited

U.S. PATENT DOCUMENTS

2012/0219017 A1   8/2012   Zhang et al.
2012/0307938 A1   12/2012  Lakkis
2012/0311410 A1   12/2012  Lakkis

OTHER PUBLICATIONS

International Search Report & Written Opinion—PCT/US09/059894, International Search Authority—European Patent Office—Feb. 24, 2010.

Ryuhei Funada et al: "A design of single carrier based PHY for IEEE 802.15.3c standard" IEEE International Symposium on Personal, Indoor and Mobile Radio Communications. PIMRC, IEEE; PI, XX, Sep. 1, 2007, pp. 1-5, XP031168950 ISBN: 978-1-4244-1143-6 the whole document abstract V. Frame Format section, A. Preamble subsection figure 3.

Taiwan Search Report—TW098134037—TIPO—Sep. 18, 2013.

\* cited by examiner

US 8,855,222 B2

CODES AND PREAMBLES FOR SINGLE CARRIER AND OFDM TRANSMISSIONS

CLAIM OF PRIORITY UNDER 35 U.S.C. §119

The present Application for patent claims benefit of Provisional Application Ser. No. 61/103,503 filed Oct. 7, 2008, and assigned to the assignee hereof and hereby expressly incorporated by reference herein.

BACKGROUND

1. Field

Certain aspects of the present disclosure generally relate to wireless communications and, more particularly, to generation of extended Golay codes and usage in different fields of a packet for single carrier and Orthogonal Frequency Division Multiplexing (OFDM) transmissions.

2. Background

Millimeter wave communications represent communications where a carrier frequency of approximately 60 GHz is utilized. A dual-mode millimeter-wave Physical Layer (PHY) can support a single carrier (SC) modulation and an Orthogonal Frequency Division Multiplexing (OFDM) modulation by employing a common mode (CM) transmission.

The CM represents a single-carrier mode used by both SC and OFDM based devices for beaconing, network-control signaling, and base-rate data communications. The CM can be typically employed for interoperability between different devices and different networks. However, a frame structure of the SC transmission mode is substantially different from a frame structure of the OFDM transmission mode, which limits the level of interoperability between the SC and OFDM devices and networks.

The present disclosure proposes generation of a frame structure suitable for use by both SC-modulated and OFDM-modulated transmission signals, while ensuring accurate channel estimation at a receiver side.

SUMMARY

Certain aspects provide a method for wireless communications. The method generally includes obtaining at least one extended Golay code of at least length $2^m+2^n$, wherein the at least one extended Golay code comprises at least a first Golay code of length $2^m$ and a second Golay code of length $2^n$, and generating a packet using the at least one extended Golay code.

Certain aspects provide an apparatus for wireless communications. The apparatus generally includes a module configured to obtain at least one extended Golay code of at least length $2^m+2^n$, wherein the at least one extended Golay code comprises at least a first Golay code of length $2^m$ and a second Golay code of length $2^n$, and a generator configured to generate a packet using the at least one extended Golay code.

Certain aspects provide an apparatus for wireless communications. The apparatus generally includes means for obtaining at least one extended Golay code of at least length $2^m+2^n$, wherein the at least one extended Golay code comprises at least a first Golay code of length $2^m$ and a second Golay code of length $2^n$, and means for generating a packet using the at least one extended Golay code.

Certain aspects provide a computer-program product for wireless communications. The computer-program product includes a computer-readable medium comprising instructions executable to obtain at least one extended Golay code of at least length $2^m+2^n$, wherein the at least one extended Golay code comprises at least a first Golay code of length $2^m$ and a second Golay code of length $2^n$, and generate a packet using the at least one extended Golay code.

Certain aspects provide a wireless node. The wireless node generally includes at least one antenna, a module configured to obtain at least one extended Golay code of at least length $2^m+2^n$, wherein the at least one extended Golay code comprises at least a first Golay code of length $2^m$ and a second Golay code of length $2^n$, a generator configured to generate a packet using the at least one extended Golay code, and a transmitter configured to transmit the generated packet via the at least one antenna.

Certain aspects provide a method for wireless communications. The method generally includes generating a preamble comprising a channel estimation (CE) field, wherein the CE field comprises a pattern being defined from a pair of Golay complementary codes, pre-pending the preamble to a data payload, and transmitting a packet having the preamble and the data payload therein.

Certain aspects provide an apparatus for wireless communications. The apparatus generally includes a generator configured to generate a preamble comprising a channel estimation (CE) field, wherein the CE field comprises a pattern being defined from a pair of Golay complementary codes, a circuit configured to pre-pend the preamble to a data payload, and a transmitter configured to transmit a packet having the preamble and the data payload therein.

Certain aspects provide an apparatus for wireless communications. The apparatus generally includes means for generating a preamble comprising a channel estimation (CE) field, wherein the CE field comprises a pattern being defined from a pair of Golay complementary codes, means for pre-pending the preamble to a data payload, and means for transmitting a packet having the preamble and the data payload therein.

Certain aspects provide a computer-program product for wireless communications. The computer-program product includes a computer-readable medium comprising instructions executable to generate a preamble comprising a channel estimation (CE) field, wherein the CE field comprises a pattern being defined from a pair of Golay complementary codes, pre-pend the preamble to a data payload, and transmit a packet having the preamble and the data payload therein.

Certain aspects provide a wireless node. The wireless node generally includes at least one antenna, a generator configured to generate a preamble comprising a channel estimation (CE) field, wherein the CE field comprises a pattern being defined from a pair of Golay complementary codes, a circuit configured to pre-pend the preamble to a data payload, and a transmitter configured to transmit via the at least one antenna a packet having the preamble and the data payload therein.

Certain aspects provide a method for wireless communications. The method generally includes receiving a channel estimation (CE) field transmitted over a wireless channel, wherein the CE field was constructed by using a pair of Golay complementary codes, processing the received CE field by using a matched filter associated with the pair of Golay complementary codes to obtain a first filter output and a second filter output, and estimating the wireless channel by combining the first and second filter outputs.

Certain aspects provide an apparatus for wireless communications. The apparatus generally includes a receiver configured to receive a channel estimation (CE) field transmitted over a wireless channel, wherein the CE field was constructed by using a pair of Golay complementary codes, a processor configured to process the received CE field by using a matched filter associated with the pair of Golay complementary codes to obtain a first filter output and a second filter output, and an estimator configured to estimate the wireless channel by combining the first and second filter outputs.

Certain aspects provide an apparatus for wireless communications. The apparatus generally includes means for receiving a channel estimation (CE) field transmitted over a wireless channel, wherein the CE field was constructed by using a pair of Golay complementary codes, means for processing the received CE field by using a matched filter associated with the pair of Golay complementary codes to obtain a first filter output and a second filter output, and means for estimating the wireless channel by combining the first and second filter outputs.

Certain aspects provide a computer-program product for wireless communications. The computer-program product includes a computer-readable medium comprising instructions executable to receive a channel estimation (CE) field transmitted over a wireless channel, wherein the CE field was constructed by using a pair of Golay complementary codes, process the received CE field by using a matched filter associated with the pair of Golay complementary codes to obtain a first filter output and a second filter output, and estimate the wireless channel by combining the first and second filter outputs.

Certain aspects provide a wireless node. The wireless node generally includes at least one antenna, a receiver configured to receive via the at least one antenna a channel estimation (CE) field transmitted over a wireless channel, wherein the CE field was constructed by using a pair of Golay complementary codes, a processor configured to process the received CE field by using a matched filter associated with the pair of Golay complementary codes to obtain a first filter output and a second filter output, and an estimator configured to estimate the wireless channel by combining the first and second filter outputs.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
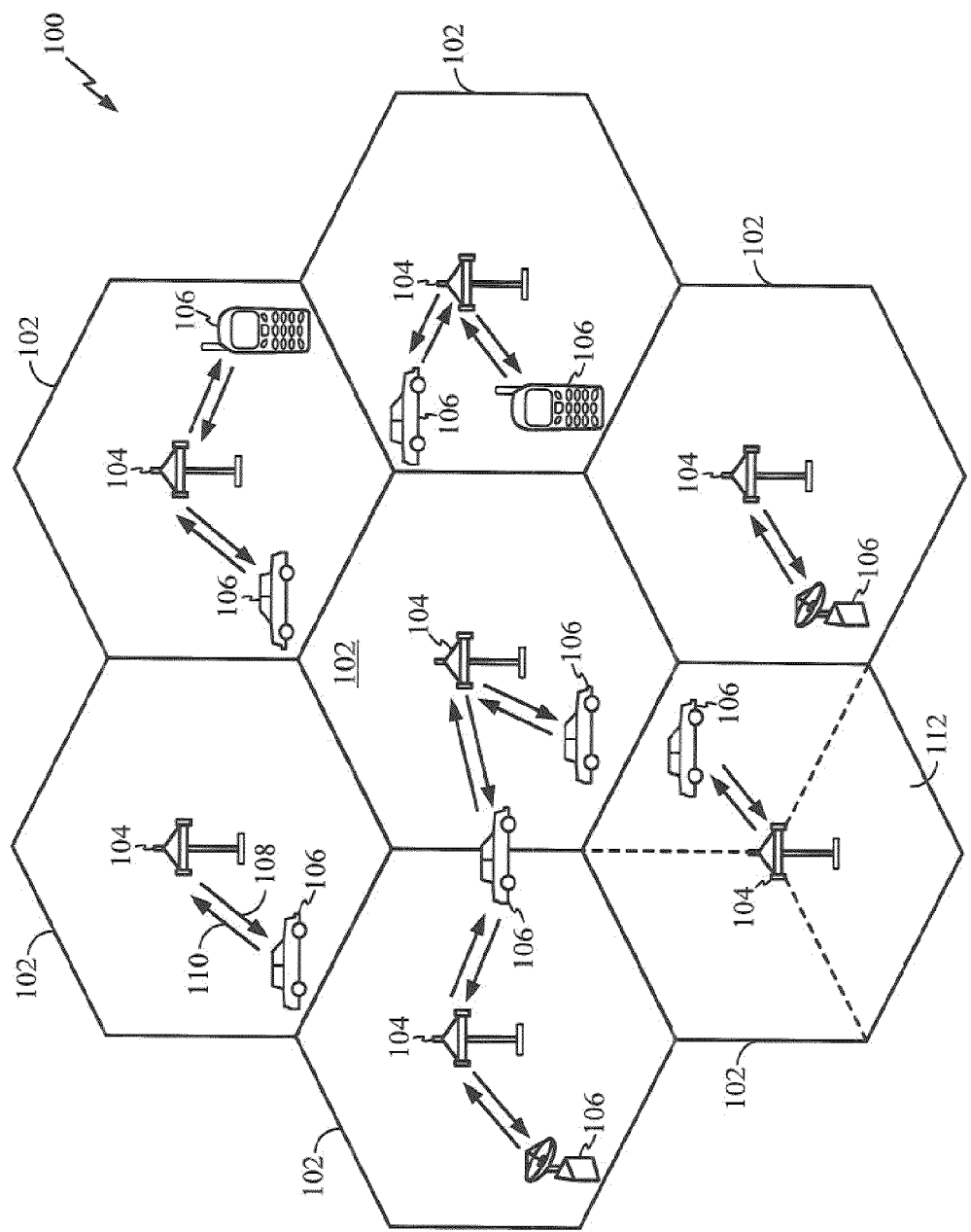
FIG. 1 illustrates an example wireless communication system, in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal or a piconet controller or other type of wireless device.

An access point ("AP") may comprise, be implemented as, or known as NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as an access terminal, a subscriber station, a subscriber unit, a mobile station, a remote station, a remote terminal, a user terminal, a user agent, a user device, user equipment, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on a single carrier transmission. Aspects disclosed herein may be advantageous to systems employing Ultra Wide Band (UWB) signals including millimeter-wave signals. However, the present disclosure is not intended to be limited to such systems, as other coded signals may benefit from similar advantages.

FIG. 1 illustrates an example of a wireless communication system 100 in which aspects of the present disclosure may be employed. The wireless communication system 100 may be a broadband wireless communication system. The wireless communication system 100 may provide communication for a number of cells 102, each of which is serviced by a base station 104. A base station 104 may be a fixed station that communicates with user terminals 106. The base station 104 may alternatively be referred to as an access point, a Node B or some other terminology. A cell 102 within the wireless communication system 100 may be a piconet comprising a collection of one or more logically associated devices that share a single identifier with a common coordinator, such as, for example, a piconet controller.

FIG. 1 depicts various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers, etc.

A variety of algorithms and methods may be used for transmissions in the wireless communication system 100 between the base stations 104 and the user terminals 106. For example, signals may be sent and received between the base stations 104 and the user terminals 106 in accordance with UWB techniques. If this is the case, the wireless communication system 100 may be referred to as an UWB system.

A communication link that facilitates transmission from a base station 104 to a user terminal 106 may be referred to as a downlink (DL) 108, and a communication link that facilitates transmission from a user terminal 106 to a base station 104 may be referred to as an uplink (UL) 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within a wireless communication system 100 may utilize antennas that concentrate the flow of power within a particular sector 112 of the cell 102. Such antennas may be referred to as directional antennas.

Figure 2:
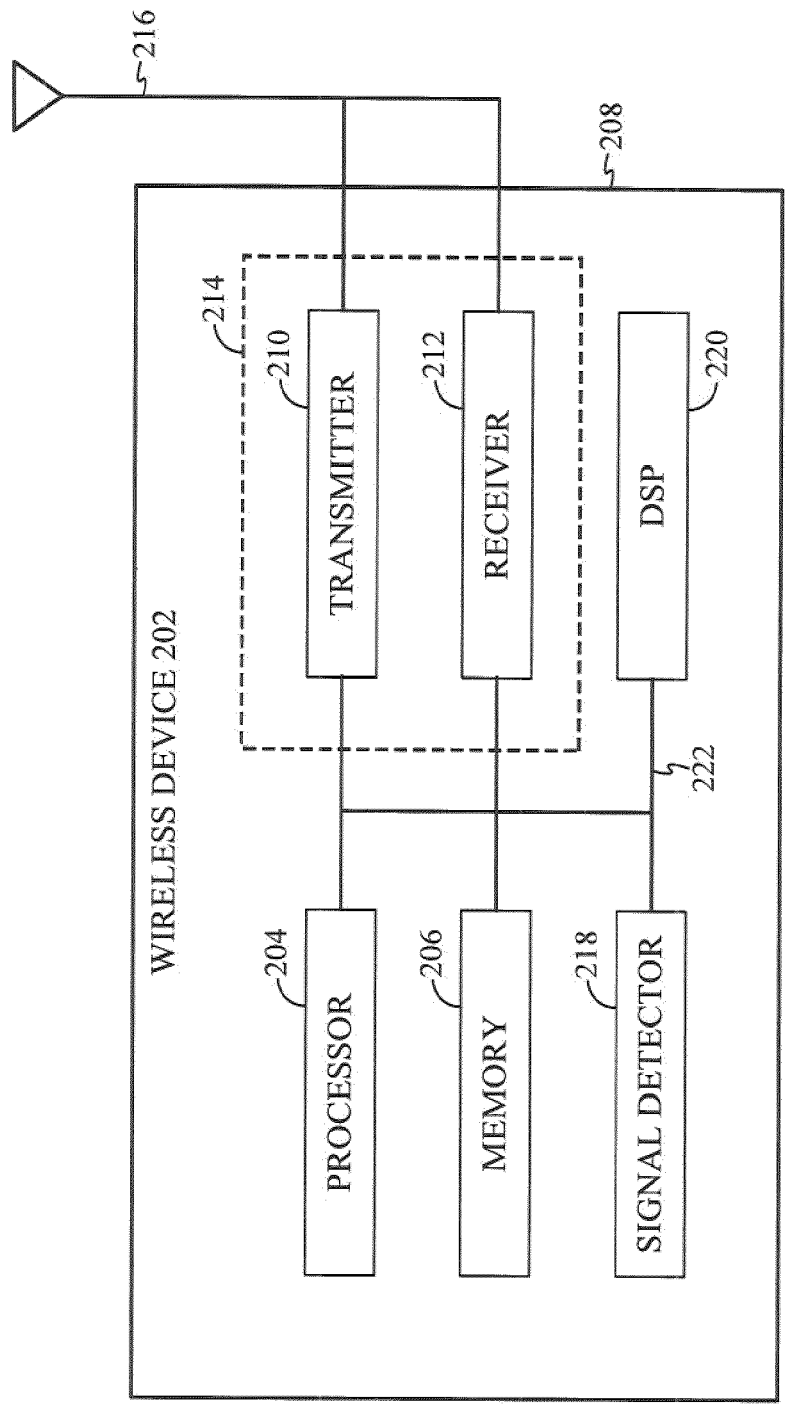
FIG. 2 illustrates various components that may be utilized in a wireless device in accordance with certain aspects of the present disclosure.

FIG. 2 illustrates various components that may be utilized in a wireless device 202 that may be employed within the wireless communication system 100. The wireless device 202 is an example of a device that may be configured to implement the various methods described herein. The wireless device 202 may be a base station 104 or a user terminal 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

Figure 3:
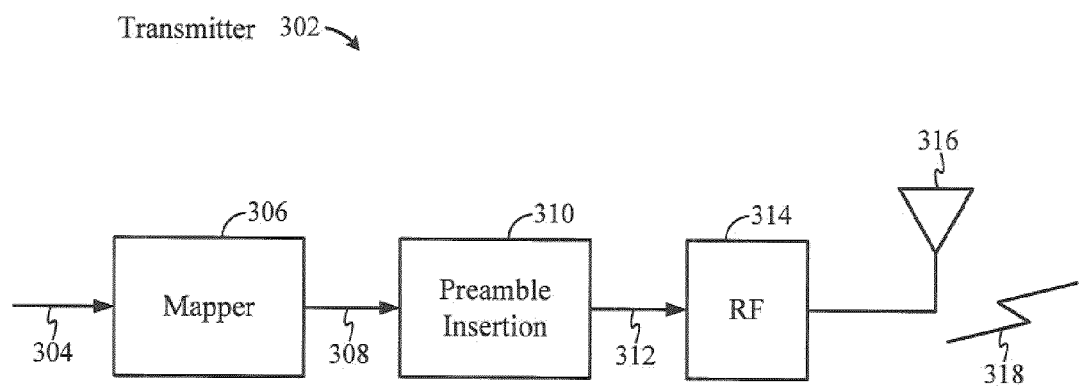
FIG. 3 illustrates an example transmitter that may be used within a wireless communication system in accordance with certain aspects of the present disclosure.

FIG. 3 illustrates an example of a transmitter 302 that may be used within a wireless communication system 100 that utilizes a single-carrier (SC), an Orthogonal Frequency Division Multiplexing (OFDM) or some other transmission technique. Portions of the transmitter 302 may be implemented in the transmitter 210 of a wireless device 202. The transmitter 302 may be implemented in a base station 104 for transmitting data 304 to a user terminal 106. The transmitter 302 may also be implemented in a user terminal 106 for transmitting data 304 to a base station 104 on an uplink 110.

Data 304 to be transmitted are shown being provided as input to a mapper 306. The mapper 306 may map the data stream 304 onto constellation points. The mapping may be done using some modulation constellation, such as binary phase-shift keying (BPSK), quadrature phase-shift keying (QPSK), 8 phase-shift keying (8PSK), quadrature amplitude modulation (QAM), etc. Thus, the mapper 306 may output a symbol stream 308, which may represent an input into a preamble insertion unit 310.

The preamble insertion unit 310 may be configured for inserting a preamble sequence at the beginning of the input symbol stream 308, and may generate a corresponding data stream 312. The preamble may be known at the receiver and may be utilized for time and frequency synchronization, channel estimation, equalization and channel decoding. The output 312 of the preamble insertion unit 310 may then be up-converted to a desired transmit frequency band by a radio frequency (RF) front end 314. An antenna 316 may then transmit a resulting signal 318 over a wireless channel.

Figure 4:
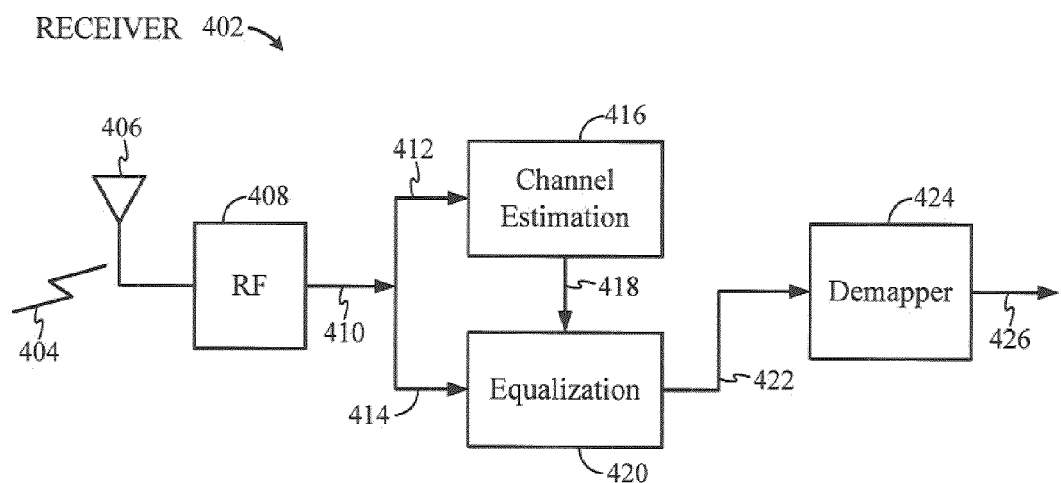
FIG. 4 illustrates an example receiver that may be used within a wireless communication system in accordance with certain aspects of the present disclosure.

FIG. 4 illustrates an example of a receiver 402 that may be used within a wireless device 202 that utilizes a single-carrier or some other transmission technique. Portions of the receiver 402 may be implemented in the receiver 212 of a wireless device 202. The receiver 402 may be implemented in a user terminal 106 for receiving data 404 from a base station 104 on a downlink 108. The receiver 402 may also be implemented in a base station 104 for receiving data 404 from a user terminal 106 on an uplink 110.

When a signal 404 is received by an antenna 406, it may be down-converted to a baseband signal 410 by an RF front end 408. A frame format of the received signal for single-carrier data communications typically comprises a preamble followed by a data portion. A portion of the preamble 412 may be used for channel estimation by unit 416. Received data 414 may be processed by an equalization unit 420 employing previously computed channel estimates 418.

A demapper 424 may input an equalized data stream 422 and may perform the inverse of the symbol mapping operation that was performed by the mapper 306 from FIG. 3 thereby outputting a data stream 426. Ideally, this data stream 426 corresponds to the data 304 that was provided as input to the transmitter 302, as illustrated in FIG. 3.

Aspects disclosed herein may be advantageous to wireless systems employing SC and OFDM signals used in 60 GHz millimeter wave systems, such as systems defined by the IEEE 802.15.3c protocol and Very High Throughput 60 (VHT60) protocol. However, the present disclosure is not intended to be limited to such systems, as other applications may benefit for similar advantages.

Design of Extended Golay Codes

The present disclosure relates to generation of Golay codes and extended Golay codes and its usage in the different fields of a packet for SC-based and OFDM-based transmissions. A pair of Golay complementary codes of length N may be specified by a delay vector $D=[D_0\ D_1\ \ldots\ D_{M-1}]$ and a seed vector $W=[W_0\ W_1\ \ldots\ W_{M-1}]$, where $N=2^M$. The elements of D may all be distinct and may be chosen from the set of values $2^0, 2^1, 2^{M-1}$. The elements of W may be binary values, i.e., +1 or −1, or quadric-phase values, i.e., +1, −1, +j, −j, or complex multilevel values.

In one aspect of the present disclosure, an extended Golay code of length $2^m+2^n$ may be obtained by attaching a first Golay code of length $2^m$ to a second Golay code of length $2^n$. The first Golay code may be pre-pended to the second Golay code or the second Golay code may be appended to the first Golay code.

In one example, a pair of Golay complementary codes may be of length 8 chips and denoted as $a^{(1)}$ and $b^{(1)}$, while another pair of Golay complementary codes may be of length 16 chips and denoted as $a^{(2)}$ and $b^{(2)}$. Then, a pair of complementary Golay codes $a^{(3)}$ and $b^{(3)}$ of length 24 chips may be constructed in many different ways. For example, the Golay code $a^{(3)}$ may be constructed by appending the Golay code $a^{(1)}$ to the Golay code $a^{(2)}$, and the Golay code $b^{(3)}$ may be constructed by appending the Golay code $b^{(1)}$ the Golay code $b^{(2)}$. Another set of extended complementary Golay codes may be constructed by appending $a^{(1)}$ to $b^{(2)}$ and $b^{(1)}$ to $a^{(2)}$.

It should be also noted that an extended Golay code of any even length may be obtained by using the proposed method and by appending a first Golay code to another extended Golay code. Also, an extended Golay code may be obtained by attaching more than two Golay codes. For example, a Golay code of length 26 chips may be obtained by attaching three Golay codes of length 16, 8, and 2 respectively to each other.

Figure 5:
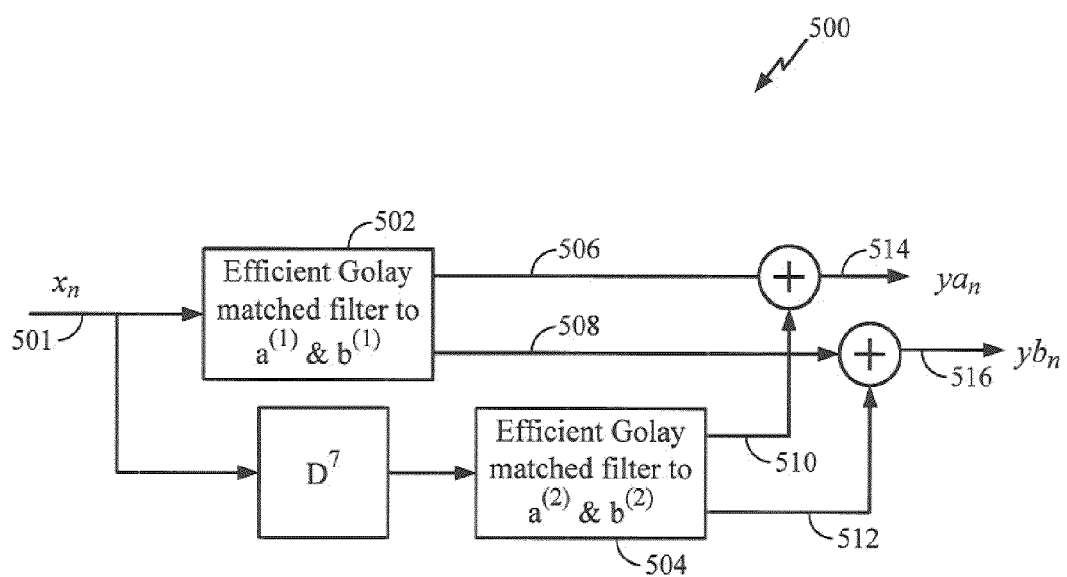
FIG. 5 illustrates an example of extended Golay matched filter that may be used within the receiver from FIG. 4 in accordance with certain aspects of the present disclosure.

FIG. 5 illustrates an extended Golay matched filter 400 that may be used within the receiver 402 from FIG. 4 in accordance with certain aspects of the present disclosure. The filter 500 may be applied to perform matched filtering to the received extended Golay codes $a^{(3)}=[a^{(1)}\ a^{(2)}]$ and $b^{(3)}=[b^{(1)}\ b^{(2)}]$ previously transmitted over a wireless channel. A Golay matched filter 502 may be matched to complementary Golay codes $(a^{(1)}, b^{(1)})$ and a Golay matched filter 504 may be matched to complementary Golay codes $(a^{(2)}, b^{(2)})$. An extended Golay code 514 (i.e., the code $a^{(3)}=[a^{(1)}\ a^{(2)}]$) may be obtained at the receiver 402 by combining matched filter outputs 506 and 510, while an extended Golay code 516 (i.e., the code $b^{(3)}=[b^{(1)}\ b^{(2)}]$) may be obtained by combining matched filter outputs 508 and 512.

Instead of being the received signal that comprises the extended Golay codes transmitted over the wireless channel, an input signal 501 may be a Dirac function or a Kronecker code. By exciting the extended Golay matched filter 500 with the Dirac or the Kronecker pulse signal, the filter 500 may be configured to be a generator of the extended Golay code sequences 514 and 516 for transmission, and it may be utilized within the transmitter 302 from FIG. 3.

Figure 6:
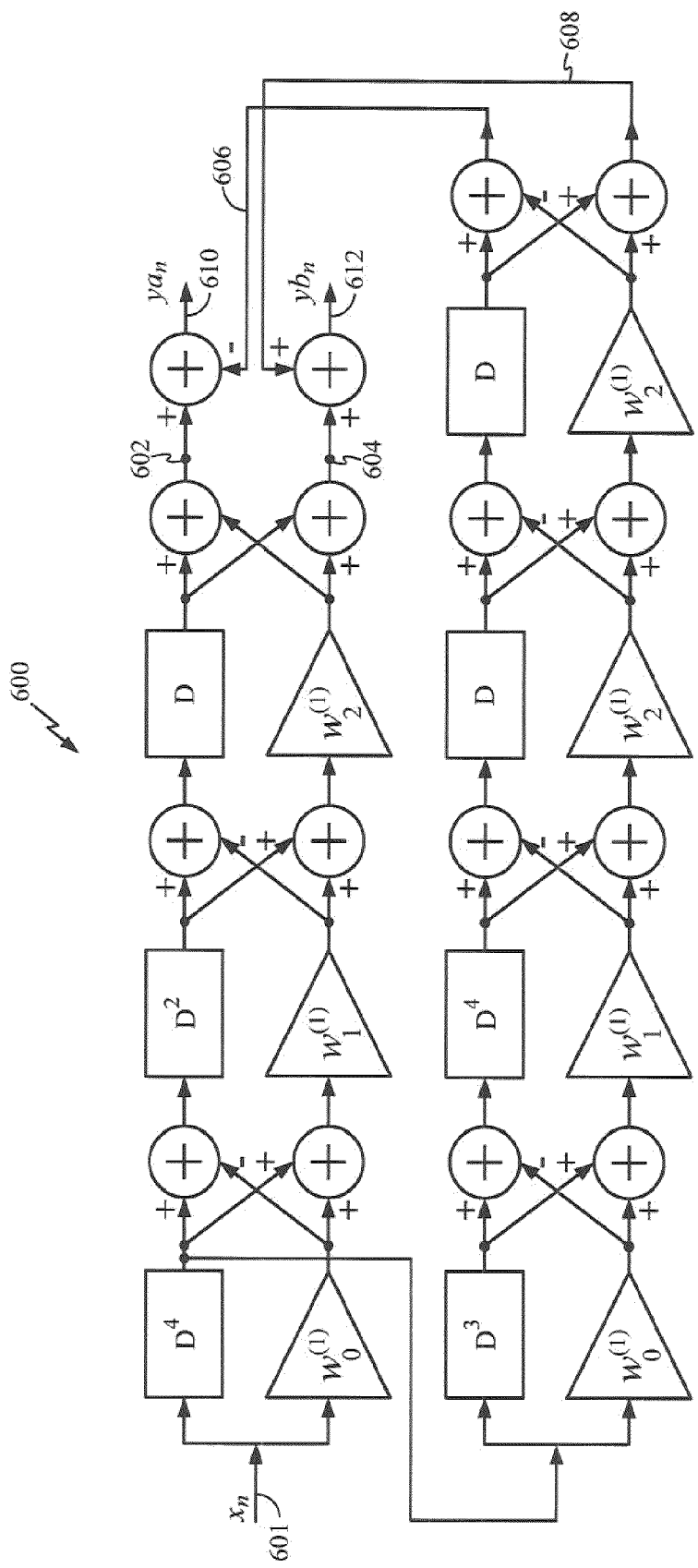
FIG. 6 illustrates another example of extended Golay matched filter that may be used within the receiver from FIG. 4 in accordance with certain aspects of the present disclosure.

FIG. 6 illustrates another example of extended Golay matched filter 600 that may be used within the receiver 402 from FIG. 4 in accordance with certain aspects of the present disclosure. An obtained extended Golay code sequence 610 may correspond to the extended Golay code $a^{(3)}=[a^{(1)}\ a^{(2)}]$, and another obtained extended Golay code sequence 612 may correspond to the extended Golay code $b^{(3)}=[b^{(1)} \ b^{(2)}]$. The sequence 610 may be obtained by combining branch a outputs 602 and 606 of two Golay matched filters that are matched to two pairs of complementary Golay codes $(a^{(1)},b^{(1)})$ and $(a^{(2)},b^{(2)})$, and the sequence 612 may be obtained by combining branch b outputs 604 and 608 of the same two Golay matched filters.

Similarly as for the filter 500 from FIG. 5, the extended Golay matched filter 600 may be excited at an input 601 by the Dirac function or the Kronecker code. In this aspect of the present disclosure, the filter 600 may be configured as a generator of the extended Golay code sequences 610 and 612 for transmission, and it may be utilized within the transmitter 302 from FIG. 3.

A packet for transmission may comprise a preamble and a data payload, and may be constructed by using the extended Golay codes. The extended Golay codes may be utilized in any of the fields of the preamble or in all fields of the preamble. The extended Golay codes may be also used as spreading codes for at least a header or the data payload of the transmission packet. Furthermore, the extended Golay codes may be inserted in the header and/or in the payload to enable frequency domain processing at a receiver.

The extended Golay codes may be used in all fields of the millimeter wave frame. This may include a Synchronization (SYNC) field, a Start Frame Delimiter (SFD) field and a Channel Estimation (CE) sequence field of the preamble. Furthermore, the extended Golay code may be used as a cyclic prefix in a sub-block of data for both SC and OFDM transmission modes.

In one aspect of the present disclosure, an extended Golay code may be obtained by retrieving it from a memory. In another aspect, the extended Golay code may be generated by using an appropriately designed circuit. In yet another aspect, the extended Golay code may be obtained by a device requesting it from another device.

Figure 7:
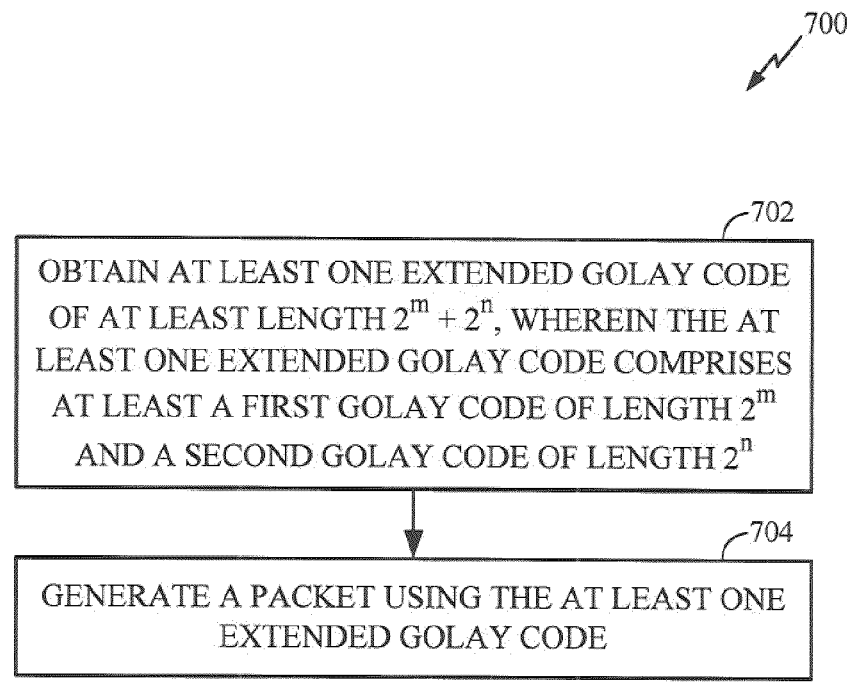
FIG. 7 illustrates example operations for designing extended Golay codes for usage within a transmission packet in accordance with certain aspects of the present disclosure.

FIG. 7 illustrates example operations 700 for designing extended Golay codes for usage within a transmission packet in accordance with certain aspects of the present disclosure. At 702, at least one extended Golay code of at least length $2^m+2^n$ may be obtained, wherein the at least one extended Golay code may comprise at least a first Golay code of length $2^m$ and a second Golay code of length $2^n$. At 704, a packet for transmission may be generated using the at least one extended Golay code.

Frame and Preamble Format

Figure 8:
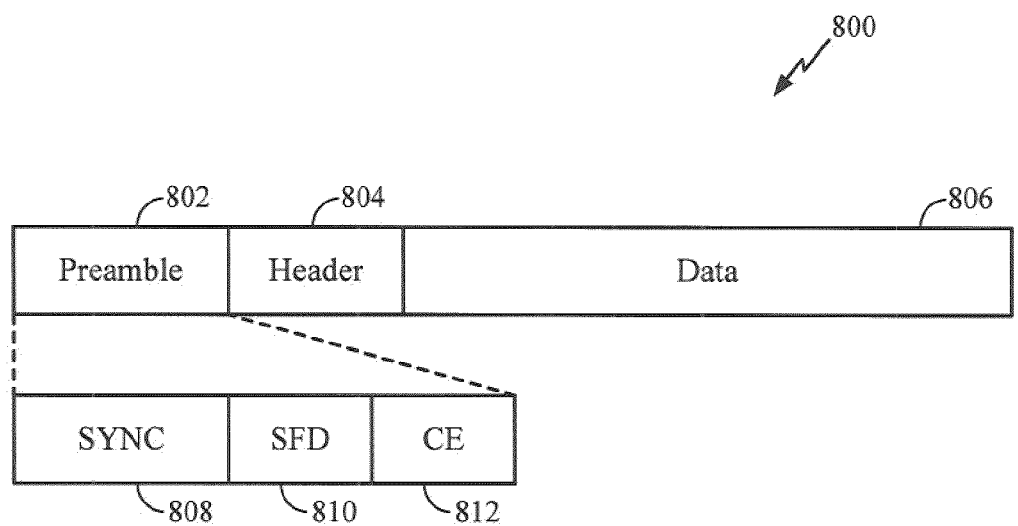
FIG. 8 illustrates an example of standard frame format for a millimeter wave communication system in accordance with certain aspects of the present disclosure.

FIG. 8 illustrates an example of standard frame format 800 used in millimeter wave communication systems such as the one adopted in the IEEE 802.15.3c standard or the one adopted for the VHT60 protocol under the IEEE 802.11 standard in accordance with certain aspects of the present disclosure. The frame 800 may comprise a preamble 802, a header 804 and a data payload 806.

The preamble 802 may be typically constructed from three fields, some of which may be combined together. A Synchronization (SYNC) field 808 may be typically used for antenna and direction selection, Automatic Gain Control (AGC), Automatic Frequency Control (AFC), and packet detection. A Start Frame Delimiter (SFD) field 810 may indicate an end of the SYNC field 808. The SFD field 810 may not be a separate field, but rather a part of the SYNC field 808 or a part of a Channel Estimation (CE) field 812. The CE field 812 may be utilized at a receiver side to estimate multipath channel taps.

The millimeter wave standards that define communications based on 60 GHz carrier frequency specify a dual mode physical layer for supporting different transmission modes and different applications. The single carrier (SC) transmission mode typically targets low power low cost markets. On the other hand, the OFDM transmission mode typically targets high performance markets. The OFDM sampling rate may be specified as 1.5 times the SC chip rate, and the OFDM transmission mode may typically use a Fast Fourier Transform (FFT) of size 512 chips.

The SC and OFDM transmission modes may share a unified preamble. Alternatively, each transmission mode may have its own preamble. It may be preferable that the SC CE field enables channel estimation of a multipath channel that extends over at least 256 chips, whereas the OFDM CE field may enable channel estimation of a multipath channel that extends over 512 chips matching the FFT size. Furthermore, it may be preferable to enable time domain and frequency domain channel estimation by using codes with perfect autocorrelation function, i.e., a Dirac function or a Kronecker code.

Figure 9:
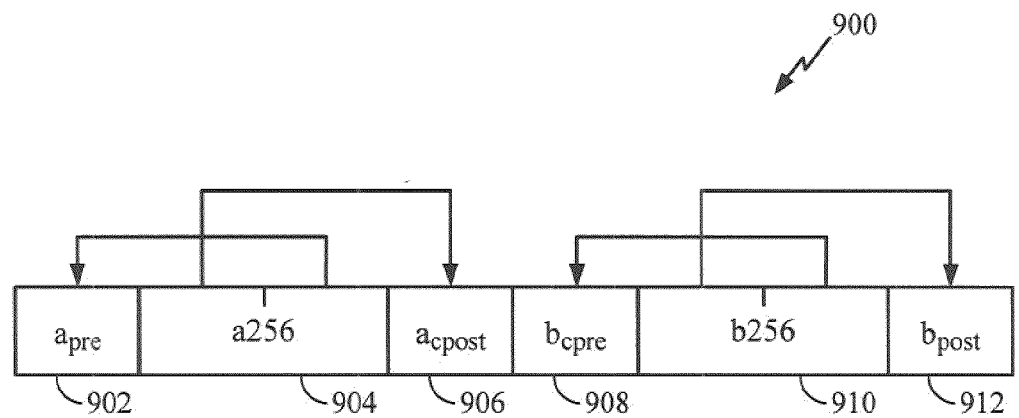
FIG. 9 illustrates an example of channel estimation (CE) field that may be used within a preamble of the frame in accordance with certain aspects of the present disclosure.

As an example, a CE field 900 illustrated in FIG. 9 may be constructed using a length 256 Golay complementary code pair (a256, b256). The CE field 900 may satisfy requirements for the SC-based transmission. As illustrated in FIG. 9, a cyclic prefix 902 of length 128 chips may be the copy of the last 128 chips of a code 904. A cyclic postfix 906 may be the copy of the first 128 chips of the code 904. The same approach may be applied to codes 908-912. The CE field 900 may be referred as a short CE field, and its length may be 1024 chips.

Figure 10:
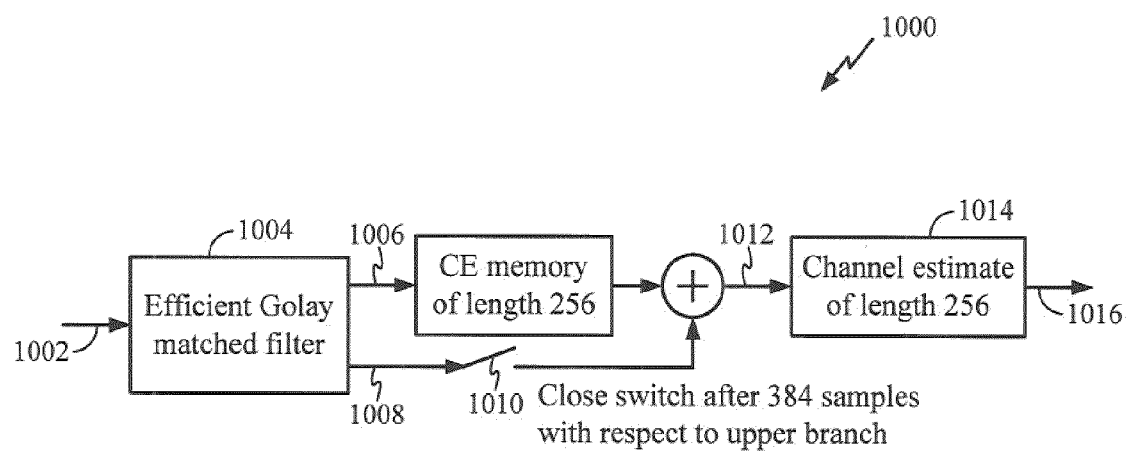
FIG. 10 illustrates an example circuitry for processing of the CE field that may be used within the receiver from FIG. 4 in accordance with certain aspects of the present disclosure.

FIG. 10 illustrates an example circuitry 1000 for processing of a CE field (e.g., the CE field 900 from FIG. 9) in accordance with certain aspects of the present disclosure. The circuitry 1000 may be used within the receiver 402 from FIG. 4 for obtaining channel estimates. Once a CE field 1002 of a preamble is received, it may be further processed in time domain. In particular, the CE field 1002 may be input into a Golay matched filter 1004. A Golay matched filter output 1006 (i.e., a branch that provides a Golay code of type a) may be combined with a Golay matched filter output 1008 (i.e., with a branch that provides a Golay code of type b), wherein the output 1008 may be taken, for example, 384 chips later than the output 1006 by closing a switch 1010 in a determined time instant. A combined sequence 1012 may be processed by a channel estimation unit 1014 to obtain channel estimates 1016.

In another aspect, the CE sequence field 1002 may be processed in frequency domain by adding the FFT of the Golay matched filter output 1006 to the FFT of the Golay matched filter output 1008 at a right time instant. The CE sequence field 1002 may be used along with a SFD field of the same received preamble to estimate multipath channels with an impulse response length of up to 256 chips.

Figure 11:
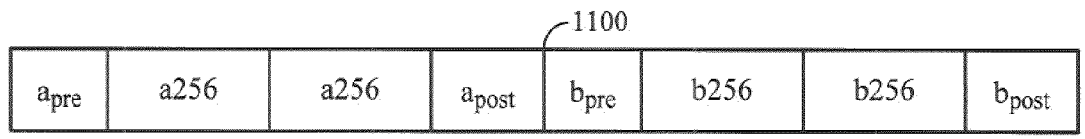
FIG. 11 illustrates an example of long CE field in accordance with certain aspects of the present disclosure.

A longer CE field may be desired at a low signal-to-noise ratio (SNR). In this case, the complementary Golay codes a256 and b256 may be repeated multiple times. FIG. 11 illustrates an example of long CE field 1100 where the repetition of two is used.

It should be noted that a Kronecker or Dirac code (sequence) of length N may be a sequence having all zero entries except for one of them. For example, the code [1 0 0 0] represents a Kronecker code of length four with the first tap being non-zero. On the other hand, a Kronecker code with a non-zero centered tap is a sequence having all its entries set to zero except its entry number N/2 (e.g., [0 0 1 0] or [0 1 0 0] for N=4).

Figure 12:
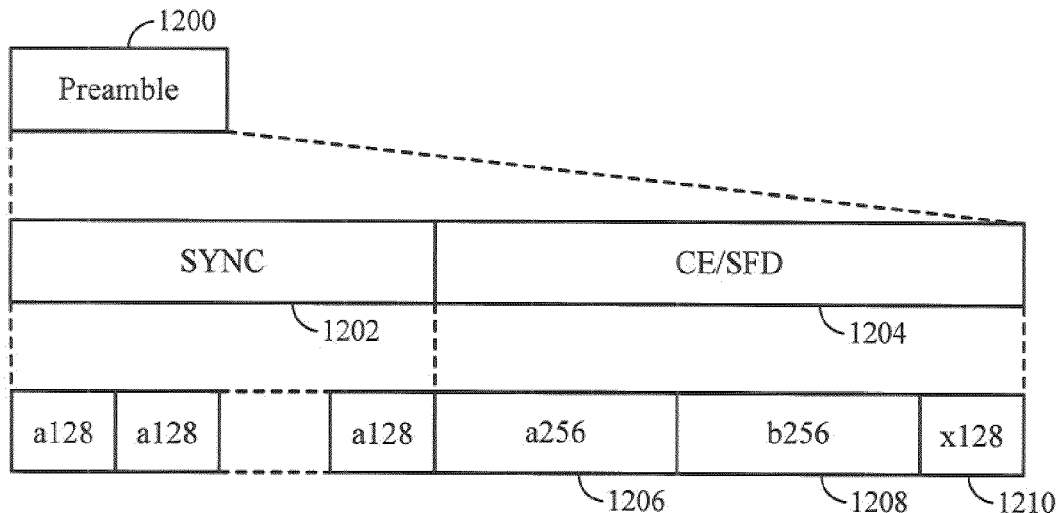
FIG. 12 illustrates an example of preamble format with a short CE field in accordance with certain aspects of the present disclosure.

FIG. 12 illustrates a preamble 1200 with a short CE/SFD field 1204 in accordance with certain aspects of the present disclosure. The preamble 1200 may also comprise a prepended SYNC field 1202. The CE/SFD field 1204 may be especially suitable for SC transmission mode. The CE/SFD field 1204 may have the length of only 640 chips providing a lower overhead compared to the long CE field 1100 of length 1024 chips.

Certain aspects of the present disclosure support four different patterns of the short CE field enabling perfect channel estimation over duration of 256 chips with a centered tap. These four patterns may be defined as:

$$\begin{bmatrix} pre & a256 & b256 & post \\ +a & +b-a & +b+a & +b \\ +a & +b+a & -b+a & +b \\ +a & -b+a & +b+a & -b \\ +a & -b-a & -b+a & -b \end{bmatrix}, \quad (1)$$

where codes a and b may refer to a Golay complementary code pair of length 128 chips, the first 128 chips in each row of equation (1) may act as a prefix and may be part of the SYNC field 1202, while the last 128 chips in each row of equation (1) may act as a postfix.

For example, the first pattern from equation (1) can be used to generate the CE/SFD field 1204 from FIG. 12. Then, a code 1206 may correspond to the extended Golay code [+b −a], a code 1208 may correspond to the extended Golay code [+b +a], and a code 1210 may correspond to the Golay code +b. Similarly, if the fourth pattern from equation (1) is used, then the code 1206 may correspond to [−b −a], the code 1208 may correspond to [−b +a], and the code 1210 may correspond to b.

Figure 13:
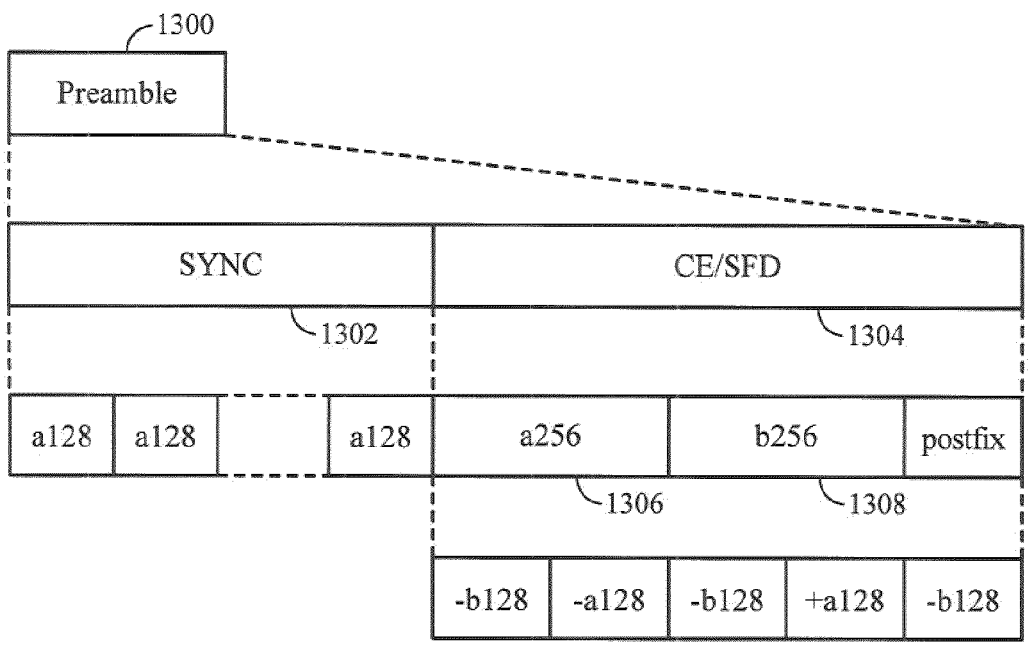
FIG. 13 illustrates another example of preamble format with a short CE field in accordance with certain aspects of the present disclosure.

FIG. 13 illustrates a preamble format 1300 with a short CE/SFD field 1304 in accordance with certain aspects of the present disclosure. The preamble 1300 may represent one example of the preamble 1200 from FIG. 12. Since the last part of a SYNC field 1302 may correspond to +a128 Golay code, the first 128 chips of the CE/SFD field 1304 may be skipped because the code +a128 in the SYNC field 1302 may act as a part of both the SYNC and CE/SFD fields. A long CE field may be obtained by repeating both codes 1306 and 1308 M times.

Figure 14:
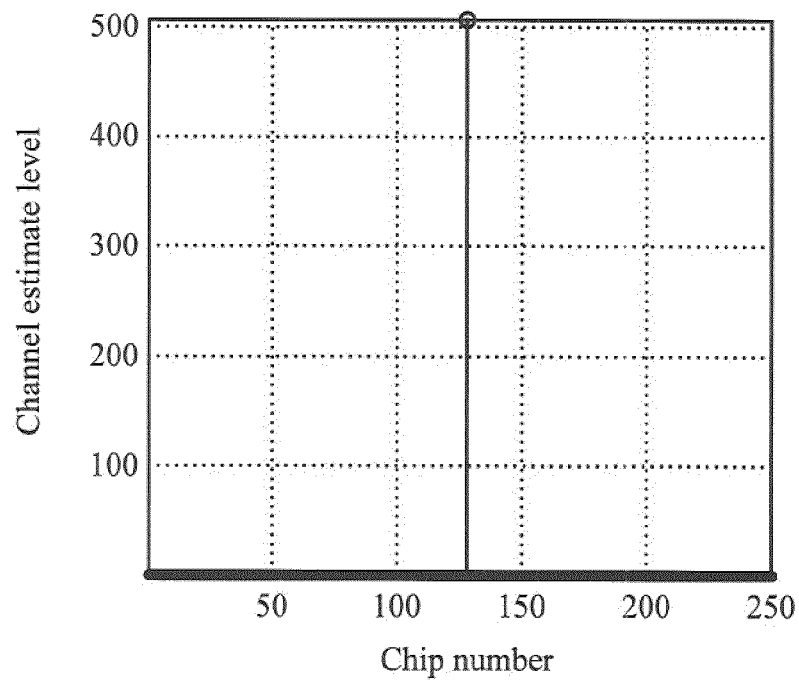
FIG. 14 illustrates an example of Kronecker code with a centered tap in accordance with certain aspects of the present disclosure.

The codes 1306 and 1308 may be processed in time domain upon reception and combined together as illustrated in FIG. 10, while the Golay matched filter output 1008 may be taken from the b branch 256 chips later (i.e., the switch 1010 may be closed after 256 chips). Then, the Kronecker (Dirac) code with the centered tap, as the one illustrated in FIG. 14, may be obtained.

The main channel tap for the set of patterns given by equation (1) may be centered. If the main channel tap is required to be the first tap, then one of the following patterns may be utilized for the CE/SFD field 1304:

$$\begin{bmatrix} prefix & a256 & b256 & post \\ +a+b & +a+b & -a+b & -a \\ +a-b & +a-b & -a-b & -a \end{bmatrix}. \quad (2)$$

Figure 15:
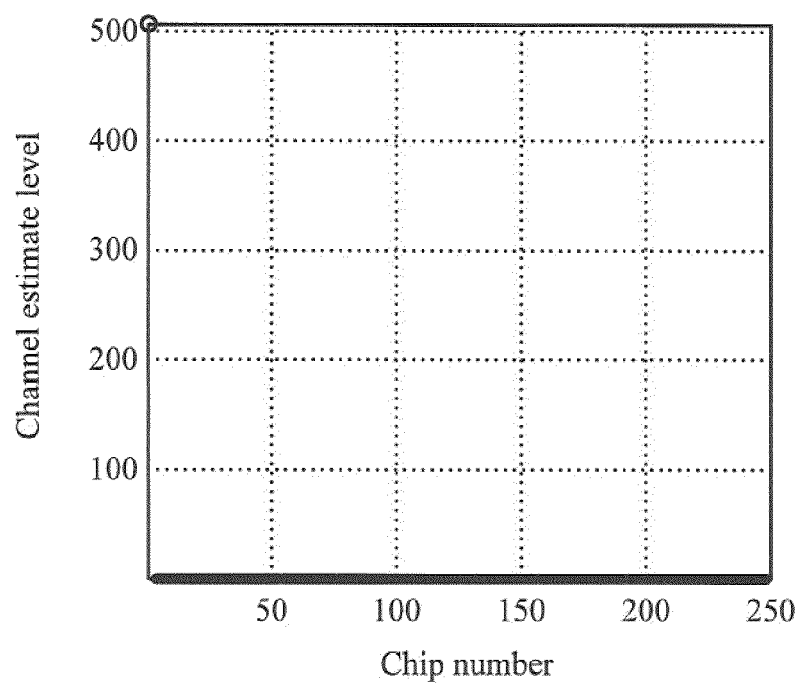
FIG. 15 illustrates an example of channel estimate for a single path in accordance with certain aspects of the present disclosure.

Again, the first Golay code +a may be part of the SYNC field 1302. Then, the short CE/SFD field 1304 may be of length 768 chips. If one of the patterns given by equation (2) is used for construction of the CE field, then the channel estimate for a single path may be obtained as the one illustrated in FIG. 15.

Figure 16:
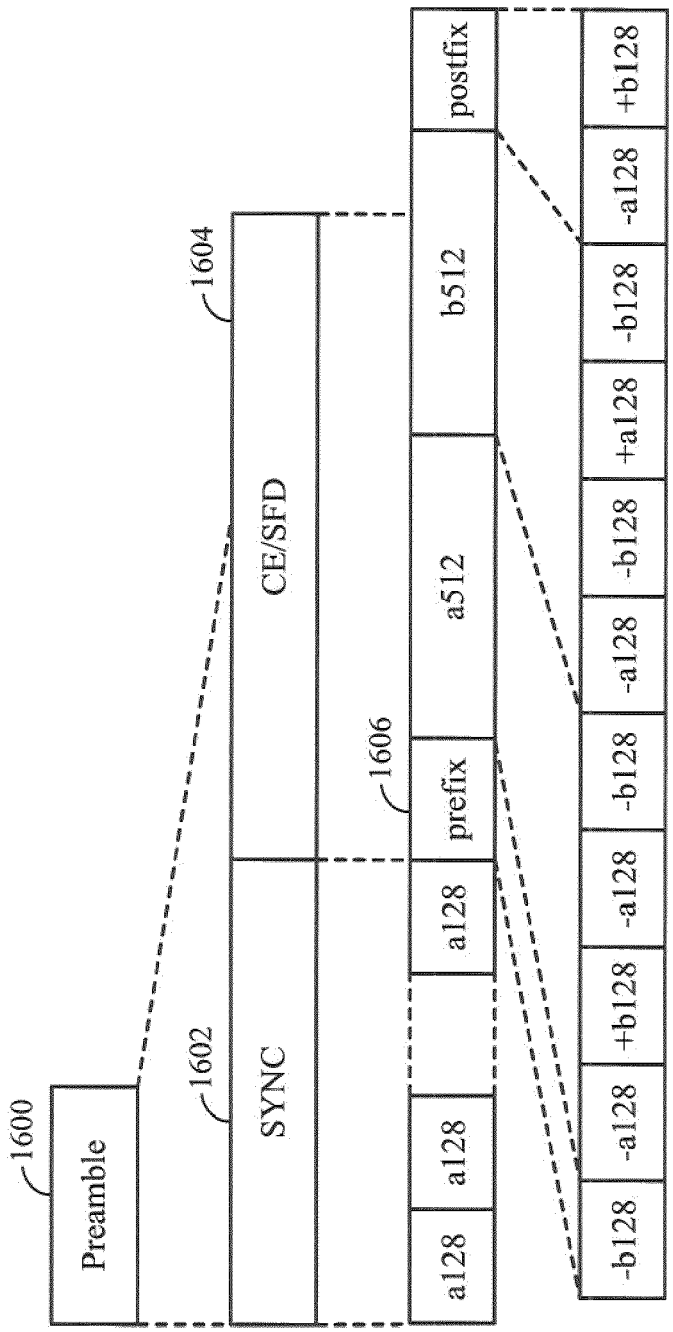
FIG. 16 illustrates an example of preamble structure for an Orthogonal Frequency Division Multiplexing (OFDM) transmission mode that may be also used for a Single Carrier (SC) transmission mode in accordance with certain aspects of the present disclosure.

The extended Golay code a256 from equation (2) may be constituted of two complementary Golay codes, whereas the extended Golay code b256 may be constituted of the same or possibly another two complementary Golay codes. Then, a long CE field may be constructed by repeating the extended Golay codes a256 and b256 multiple times Certain aspects of the present disclosure support design and utilization of an efficient preamble structure suitable for OFDM transmission mode that may also support the SC-based transmissions. FIG. 16 illustrates an example of this particular preamble structure 1600. Certain aspects of the present disclosure support utilization of one of possible 16 patterns for a long CE/SFD field 1604 of the preamble 1600, which may enable a perfect channel estimation of length 512 chips with a centered tap. These 16 patterns may be defined as:

$$\begin{bmatrix} prefix & a512 & b512 & postfix \\ -b & -a+b-a-b & -a-b+a-b & -a+b \\ +b & -a-b-a+b & -a+b+a+b & -a-b \\ +b & +a+b-a+b & +a-b+a+b & +a+b \\ -b & +a+b-a+b & +a+b+a-b & +a+b \\ -b & +a+b+a+b & -a+b+a-b & +a+b \\ -b & +a+b+a-b & -a-b+a-b & +a+b \\ +b & -a+b+a-b & +a+b+a+b & -a+b \\ +b & -a+b-a-b & -a+b+a+b & -a+b \\ +b & -a+b+a+b & +a-b+a+b & -a+b \\ +b & +a-b+a+b & -a+b+a+b & +a-b \\ +b & +a-b-a-b & +a-b+a+b & +a-b \\ +b & -a+b+a-b & -a-b+a+b & +a-b \\ -b & +a-b-a-b & +a+b+a-b & +a-b \\ -b & -a-b+a-b & +a+b+a-b & -a-b \\ -b & -a-b+a+b & +a-b+a-b & -a-b \\ -b & -a-b-a+b & -a-b+a-b & -a-b \end{bmatrix}. \quad (3)$$

In the preferred aspects of the present disclosure, the first two patterns from equation (3) may be utilized for generation of the long CE/SFD field 1604. In one aspect, the pattern [prefix a512 b512 postfix] may be used for the SC-based transmission, while the pattern [prefix b512 a512 postfix] may be used for the OFDM-based transmission. Then, detection of a512 code versus b512 code may identify whether the received preamble is a SC preamble or an OFDM preamble. It should be also noted that the last a128 code of the SYNC field 1602 may act as a part of a prefix 1606 of the CE/SFD field 1604.

Certain aspects of the present disclosure support utilization of one of possible 16 patterns for generation of the long CE/SFD field 1604 of the preamble 1600, which may enable a perfect channel estimation of length 512 chips with a main tap in the first position. These 16 patterns may be defined as:

$$\begin{bmatrix} a512 & \text{prefix} & b512 & \text{postfix} \\ +b-a+b+a & +b & -a+b-a-b & -a+b-a+b \\ -b-a-b+a & -b & -a-b-a+b & -a-b-a-b \\ +b-a+b-a & -b & +a-b-a-b & -a+b+a-b \\ -b-a+b-a & -b & -a+b+a+b & -a+b+a-b \\ -b+a+b-a & +b & -a-b-a+b & +a+b+a+b \\ +b+a+b-a & +b & +a+b+a-b & +a+b+a+b \\ -b-a-b-a & +b & +a+b-a+b & -a-b+a+b \\ +b-a-b-a & +b & -a-b+a-b & -a-b+a+b \\ -b-a+b+a & +b & +a-b+a+b & -a+b-a+b \\ -b+a-b+a & +b & -a+b+a+b & +a-b-a+b \\ +b+a-b+a & +b & +a-b-a-b & +a-b-a+b \\ -b+a-b-a & -b & +a-b+a+b & +a-b+a-b \\ +b+a-b-a & -b & -a+b-a-b & +a-b+a-b \\ -b+a+b+a & -b & +a+b-a+b & +a+b-a-b \\ +b+a+b+a & -b & -a-b+a-b & +a+b-a-b \\ +b-a-b+a & -b & +a+b+a-b & -a-b-a-b \end{bmatrix} \quad (4)$$

Figure 17:
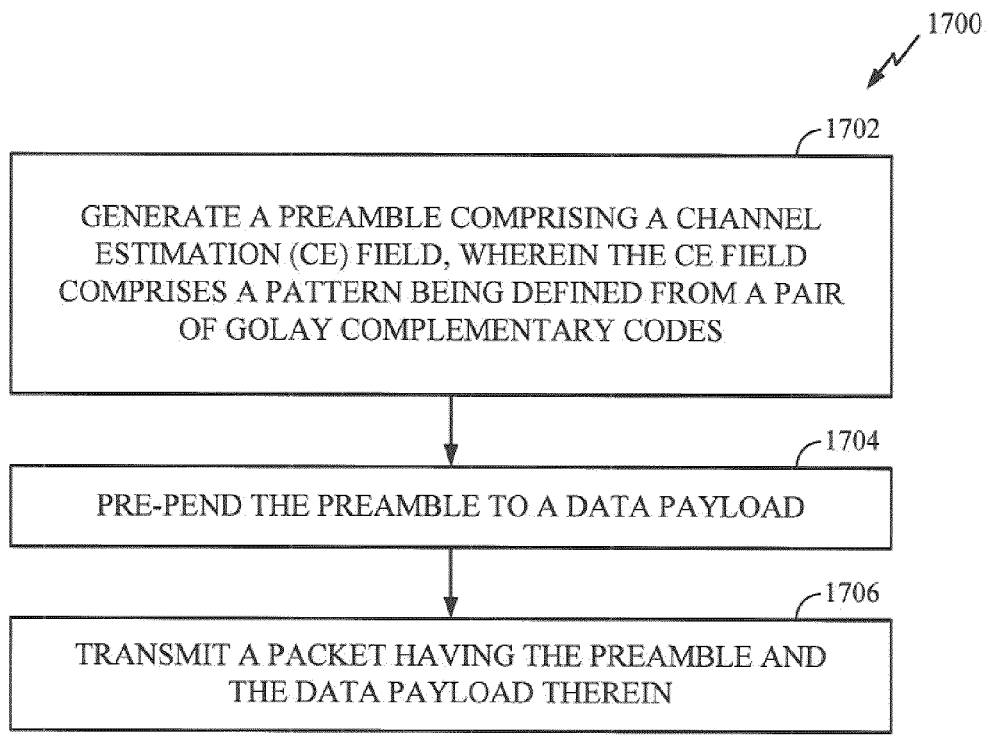
FIG. 17 illustrates example operations for designing a preamble structure within a transmission frame in accordance with certain aspects of the present disclosure.

FIG. 17 illustrates example operations 1700 for designing a preamble structure within a transmission frame in accordance with certain aspects of the present disclosure. At 1702, a preamble comprising a CE field may be generated, wherein the CE field may comprise a pattern being defined from a pair of Golay complementary codes. At 1704, the preamble may be pre-pended to a data payload. At 1706, a packet having the preamble and the data payload therein may be transmitted over a wireless channel.

Figure 18:
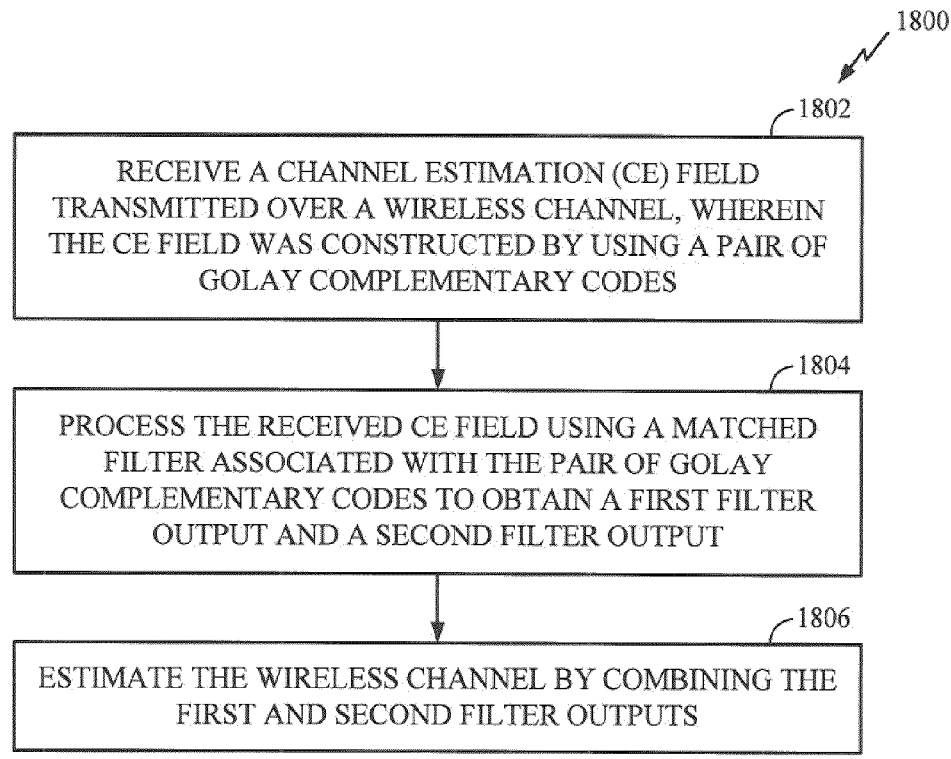
FIG. 18 illustrates example operations for processing of a received CE sequence to obtain channel estimates in accordance with certain aspects of the present disclosure.

FIG. 18 illustrates example operations 1800 for processing of the received CE sequence field to obtain channel estimates in accordance with certain aspects of the present disclosure. At 1802, the CE field may be received within the packet that was transmitted over the wireless channel, wherein the CE field was constructed by using a pair of Golay complementary codes. At 1804, the received CE field may be processed by using a matched filter for the pair of Golay complementary codes to obtain a first filter output and a second filter output. At 1806, estimates of the wireless channel may be obtained by combining the first and second filter outputs.

Figure 7A:
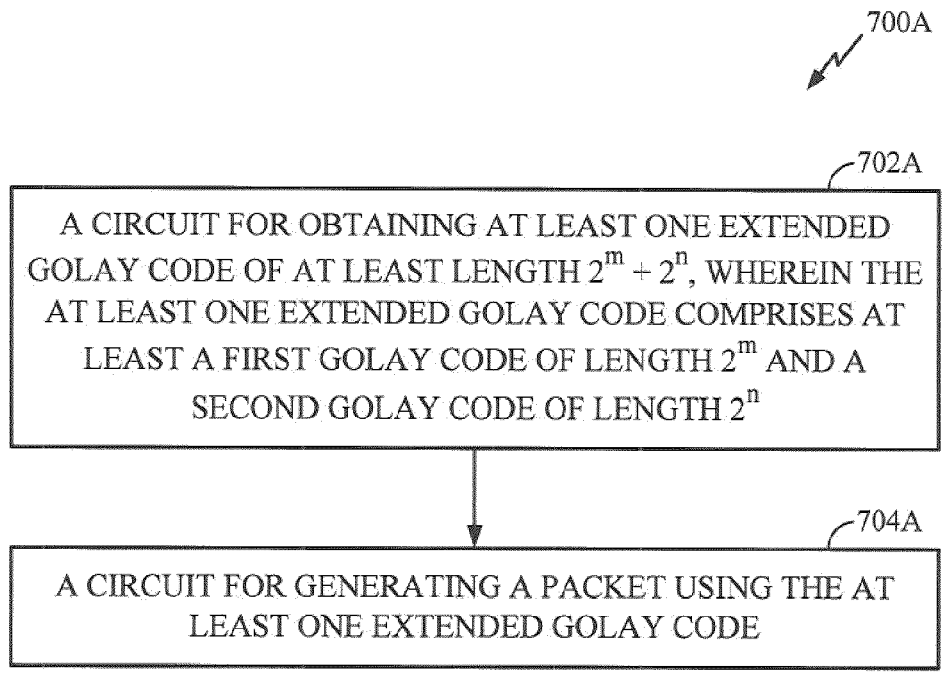
FIG. 7A illustrates example components capable of performing the operations illustrated in FIG. 7.
Figure 17A:
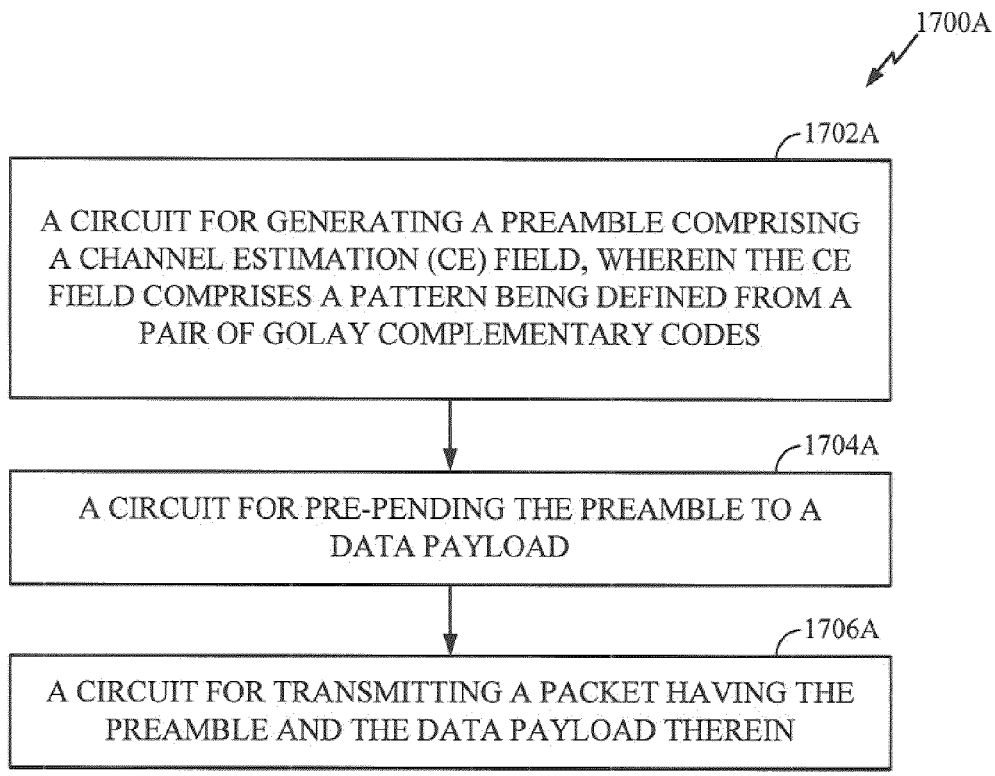
FIG. 17A illustrates example components capable of performing the operations illustrated in FIG. 17.
Figure 18A:
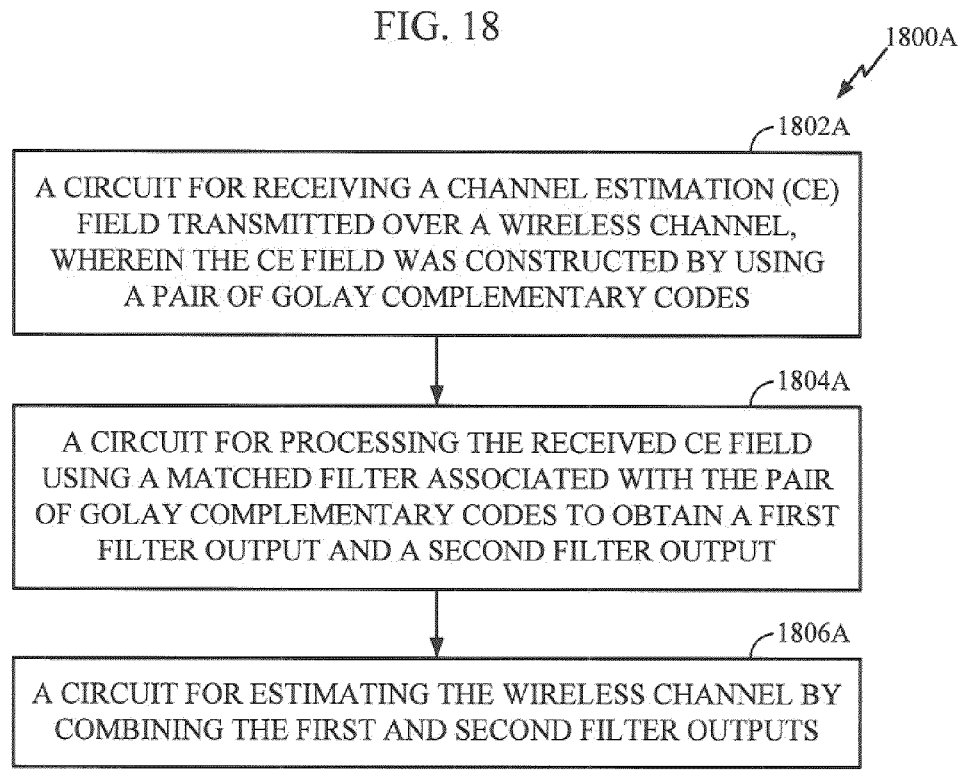
FIG. 18A illustrates example components capable of performing the operations illustrated in FIG. 18.

The various operations of methods described above may be performed by any suitable means capable of performing the corresponding functions. The means may include various hardware and/or software component(s) and/or module(s), including, but not limited to a circuit, an application specific integrate circuit (ASIC), or processor. Generally, where there are operations illustrated in Figures, those operations may have corresponding counterpart means-plus-function components with similar numbering. For example, blocks 702-704, 1702-1706 and 1802-1806, illustrated in FIGS. 7, 17 and 18 correspond to circuit blocks 702A-704A, 1702A-1706A and 1802A-1806A illustrated in FIGS. 7A, 17A and 18A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Also, "determining" may include measuring, estimating and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communications, comprising:
   obtaining, by an apparatus, at least one extended Golay code of at least length $2^m+2^n$, wherein the at least one extended Golay code comprises at least a first Golay code of length $2^m$ and a second Golay code of length $2^n$, and wherein the length $2^m$ is different than the length $2^n$, where m and n are integers of different values; and
   generating, by the apparatus, a packet using the at least one extended Golay code.

2. The method of claim 1, wherein obtaining the at least one extended Golay code comprises using at least one matched filter configured to generate at least one of the Golay codes.

3. The method of claim 1, wherein obtaining the at least one extended Golay code comprises retrieving the at least one extended Golay code from a memory.

4. The method of claim 1, wherein obtaining the at least one extended Golay code comprises receiving the at least one extended Golay code from an apparatus.

5. The method of claim 1, wherein the first Golay code is pre-pended to the second Golay code.

6. The method of claim 1, wherein the generation of the packet comprises:
   using the at least one extended Golay code to spread data of at least one of a header field or a payload field of the packet.

7. The method of claim 1, wherein the packet comprises a preamble having the at least one extended Golay code being inserted therein.

8. The method of claim 7, wherein at least one of a synchronization field, a start frame delimiter field or a channel estimation field of the preamble comprises the at least one extended Golay code.

9. The method of claim 1, further comprising:
   inserting the at least one extended Golay code into at least one of a header field or a payload field of the packet.

10. The method of claim 1, wherein the at least one extended Golay code comprises at least two extended Golay codes with different lengths or a same length.

11. The method of claim 1, wherein the at least one extended Golay code comprises at least two extended Golay codes that are complementary.

12. An apparatus for wireless communications, comprising:
    a module configured to obtain at least one extended Golay code of at least length $2^m+2^n$, wherein the at least one extended Golay code comprises at least a first Golay code of length $2^m$ and a second Golay code of length $2^n$, and wherein the length $2^m$ is different than the length $2^n$, where m and n are integers of different values; and
    a generator configured to generate a packet using the at least one extended Golay code.

13. The apparatus of claim 12, wherein the module is also configured to use at least one matched filter configured to generate at least one of the Golay codes.

14. The apparatus of claim 12, wherein the module is also configured to retrieve the at least one extended Golay code from a memory.

15. The apparatus of claim 12, wherein the module is also configured to receive the at least one extended Golay code from another apparatus.

16. The apparatus of claim 12, wherein the first Golay code is pre-pended to the second Golay code.

17. The apparatus of claim 12, wherein the generator is also configured to use the at least one extended Golay code to spread data of at least one of a header field or a payload field of the packet.

18. The apparatus of claim 12, wherein the packet comprises a preamble having the at least one extended Golay code being inserted therein.

19. The apparatus of claim 18, wherein at least one of a synchronization field, a start frame delimiter field or a channel estimation field of the preamble comprises the at least one extended Golay code.

20. The apparatus of claim 12, further comprising:
    a circuit configured to insert the at least one extended Golay code into at least one of a header field or a payload field of the packet.

21. The apparatus of claim 12, wherein the at least one extended Golay code comprises at least two extended Golay codes with different lengths or a same length.

22. The apparatus of claim 12, wherein the at least one extended Golay code comprises at least two extended Golay codes that are complementary.

23. An apparatus for wireless communications, comprising:
    means for obtaining at least one extended Golay code of at least length $2^m+2^n$, wherein the at least one extended Golay code comprises at least a first Golay code of length $2^m$ and a second Golay code of length $2^n$, and wherein the length $2^m$ is different than the length $2^n$, where m and n are integers of different values; and
    means for generating a packet using the at least one extended Golay code.

24. The apparatus of claim 23, wherein the means for obtaining the at least one extended Golay code comprises:
    means for using at least one matched filter configured to generate at least one of the Golay codes.

25. The apparatus of claim 23, wherein the means for obtaining the at least one extended Golay code comprises:

means for retrieving the at least one extended Golay code from a memory.

26. The apparatus of claim 23, wherein the means for obtaining the at least one extended Golay code comprises:
means for receiving the at least one extended Golay code from an apparatus.

27. The apparatus of claim 23, wherein the first Golay code is pre-pended to the second Golay code.

28. The apparatus of claim 23, wherein the means for generating the packet comprises:
means for using the at least one extended Golay code to spread data of at least one of a header field or a payload field of the packet.

29. The apparatus of claim 23, wherein the packet comprises a preamble having the at least one extended Golay code being inserted therein.

30. The apparatus of claim 29, wherein at least one of a synchronization field, a start frame delimiter field or a channel estimation field of the preamble comprises the at least one extended Golay code.

31. The apparatus of claim 23, further comprising:
means for inserting the at least one extended Golay code into at least one of a header field or a payload field of the packet.

32. The apparatus of claim 23, wherein the at least one extended Golay code comprises at least two extended Golay codes with different lengths or a same length.

33. The apparatus of claim 23, wherein the at least one extended Golay code comprises at least two extended Golay codes that are complementary.

34. A computer-program product for wireless communications, comprising a computer-readable storage device storing instructions executable to:
obtain at least one extended Golay code of at least length $2^m+2^n$, wherein the at least one extended Golay code comprises at least a first Golay code of length $2^m$ and a second Golay code of length $2^n$, and wherein the length $2^m$ is different than the length $2^n$, where m and n are integers of different values; and
generate a packet using the at least one extended Golay code.

* * * * *